US012639818B2

(12) United States Patent
Huang

(10) Patent No.: US 12,639,818 B2
(45) Date of Patent: May 26, 2026

(54) INFORMATION GENERATION METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventor: Jiabin Huang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 528 days.

(21) Appl. No.: 18/042,143

(22) PCT Filed: Aug. 11, 2021

(86) PCT No.: PCT/CN2021/111979
§ 371 (c)(1),
(2) Date: Feb. 17, 2023

(87) PCT Pub. No.: WO2022/037452
PCT Pub. Date: Feb. 24, 2022

(65) Prior Publication Data
US 2023/0306602 A1 Sep. 28, 2023

(30) Foreign Application Priority Data

Aug. 19, 2020 (CN) .......................... 202010837740.6

(51) Int. Cl.
*G06T 7/11* (2017.01)
*G06T 7/136* (2017.01)
(Continued)

(52) U.S. Cl.
CPC ................ *G06T 7/11* (2017.01); *G06T 7/136* (2017.01); *G06T 7/143* (2017.01); *G06T 7/62* (2017.01);
(Continued)

(58) Field of Classification Search
CPC . G06T 7/11; G06T 7/136; G06T 7/143; G06T 7/62; G06T 2207/30196;
(Continued)

(56) References Cited

U.S. PATENT DOCUMENTS 11,393,089 B2 * 7/2022 Dawson, Jr. .............. G06T 7/73
2008/0069452 A1 * 3/2008 Matsumoto ............... G06T 7/62
382/207
(Continued)

FOREIGN PATENT DOCUMENTS

CN 1700297 A * 11/2005
CN 106651955 A 5/2017
(Continued)

OTHER PUBLICATIONS

Burkard Polster, "Gauss's magic shoelace area formula and its calculus companion", Jun. 10, 2017, Mathologer, Youtube, 6:23-7:46, https://www.youtube.com/watch?v=0KjG8Pg6LGk (Year: 2017).*
(Continued)

*Primary Examiner* — Sumati Lefkowitz
*Assistant Examiner* — Anna Lei
(74) *Attorney, Agent, or Firm* — BakerHostetler

(57) ABSTRACT

An information generation method and apparatus, an electronic device, and a computer readable medium. The method comprises: generating a target region set on the basis of an obtained first target picture (201); selecting a target region satisfying a preset condition from the target region set as a candidate region to obtain a candidate region set (202); generating a second target picture on the basis of the candidate region set (203); and generating picture related information on the basis of the second target picture (204). Thus, effective extraction for a target region and further classification for the target region are achieved, so that an identification result of an image region is finer, and then the
(Continued)

subsequent image processing technology has a promotion space.

16 Claims, 4 Drawing Sheets

(51) Int. Cl.
  *G06T 7/143*          (2017.01)
  *G06T 7/62*           (2017.01)
(52) U.S. Cl.
  CPC .............. *G06T 2207/20081* (2013.01); *G06T 2207/20084* (2013.01); *G06T 2207/30196* (2013.01)
(58) Field of Classification Search
  CPC . G06T 2207/20081; G06T 2207/20084; G06T 3/04; G06V 40/107; G06N 3/045; G06F 16/51
  See application file for complete search history.

(56) References Cited

U.S. PATENT DOCUMENTS

| | | | | |
|---|---|---|---|---|
| 2019/0057244 | A1* | 2/2019 | Mei ...................... | G06V 10/235 |
| 2019/0375109 | A1* | 12/2019 | High ..................... | B25J 11/008 |

FOREIGN PATENT DOCUMENTS

| | | | | | |
|---|---|---|---|---|---|
| CN | 106934346 | A | | 7/2017 | |
| CN | 107301657 | A | | 10/2017 | |
| CN | 108876791 | A | | 11/2018 | |
| CN | 109522429 | A | | 3/2019 | |
| CN | 109559324 | A | | 4/2019 | |
| CN | 110096987 | A | | 8/2019 | |
| CN | 110135237 | A | | 8/2019 | |
| CN | 110349096 | A | * 10/2019 | .............. | G06T 5/80 |
| CN | 110796663 | A | | 2/2020 | |
| CN | 106127181 | B | * 3/2020 | ......... | G06Q 30/0643 |
| CN | 111213178 | A | * 5/2020 | .......... | G06V 10/267 |
| CN | 111881944 | A | | 11/2020 | |
| CN | 111968030 | A | | 11/2020 | |
| WO | WO-2020140198 | A1 | * 7/2020 | ............. | G06V 10/28 |

OTHER PUBLICATIONS

Written Opinion for International Application No. PCT/CN2021/111979, mailed Nov. 1, 2021, 11 Pages.
International Patent Application No. PCT/CN2021/111979; Int'l Search Report; dated Nov. 1, 2021; 3 pages.

* cited by examiner

200

201
Generate a target region set based on an obtained first target picture

202
Select a target region that meets a preset condition from the target region set as a candidate region to obtain a candidate region set 203
Generate a second target picture based on the candidate region set 204
Generate picture related information based on the second target picture

300

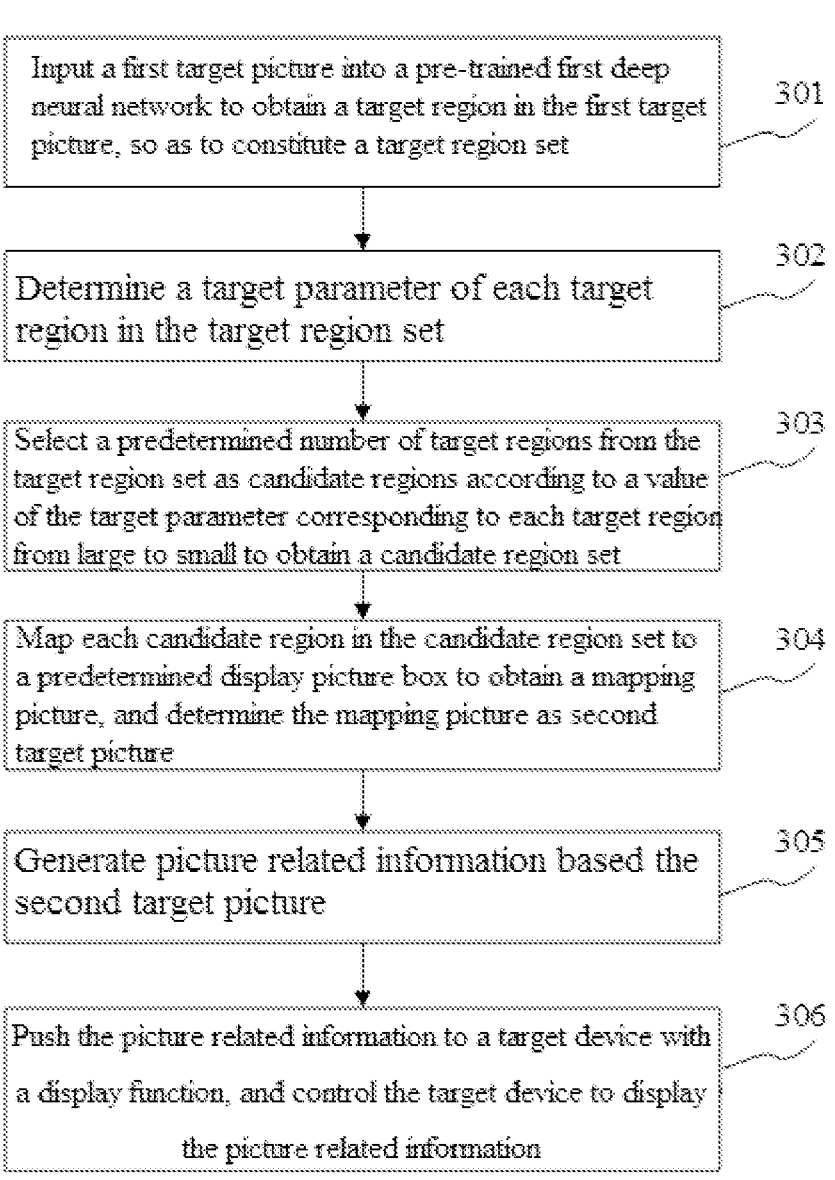

Input a first target picture into a pre-trained first deep neural network to obtain a target region in the first target picture, so as to constitute a target region set    301

Determine a target parameter of each target region in the target region set    302

Select a predetermined number of target regions from the target region set as candidate regions according to a value of the target parameter corresponding to each target region from large to small to obtain a candidate region set    303

Map each candidate region in the candidate region set to a predetermined display picture box to obtain a mapping picture, and determine the mapping picture as second target picture    304

Generate picture related information based the second target picture    305

Push the picture related information to a target device with a display function, and control the target device to display the picture related information    306

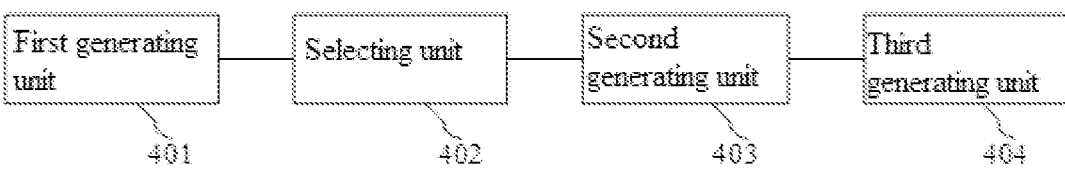

First generating unit    401

Selecting unit    402

Second generating unit    403

Third generating unit    404

Fig. 4

INFORMATION GENERATION METHOD AND APPARATUS, ELECTRONIC DEVICE, AND COMPUTER READABLE MEDIUM

CROSS-REFERENCE

This application is the U.S. National Stage of International Application No. PCT/CN2021/111979, filed on Aug. 11, 2021, which was filed based on the Chinese patent application No. 202010837740.6 with a filing date of Aug. 19, 2020, and a title of "INFORMATION GENERATION METHOD AND APPARATUS, ELECTRONIC DEVICE, AND COMPUTER READABLE MEDIUM", and claims priority to the Chinese Patent Application, both of which are incorporated herein by reference in their entireties.

FIELD

Embodiments of the present disclosure relate to the technical field of computers, in particular to an information generation method and apparatus, an electronic device and a computer readable medium.

BACKGROUND

With the development of the times, a variety of picture processing methods have also emerged. Users need to use some regions of a picture as materials to make a new picture, but also have higher requirements. For example, when the users get the required regional materials, they also want to get relevant information to enrich their understanding of the materials. Therefore, an effective method for extracting and analyzing a target region displayed in the picture is needed.

SUMMARY

The content section of this disclosure is used to present ideas in a brief form that will be described in detail in the specific embodiments section that follows. The content portion of this disclosure is not intended to identify key features or essential features of the claimed technical solution, nor is it intended to limit the scope of the claimed protected technical solution.

Some embodiments of the present disclosure propose information generation methods and apparatus, electronic devices, and computer readable media to solve the technical problems mentioned in the background technology section above.

In a first aspect, some embodiments of the present disclosure provide an information generation method, comprising: generating a target region set based on an obtained first target picture; selecting a target region that meets a preset condition from the target region set as a candidate region to obtain a candidate region set; generating a second target picture based on the candidate region set; and generating picture related information based on the second target picture.

In a second aspect, some embodiments of the present disclosure provide an information generation apparatus, comprising: a first generating unit, configured to generate a target region set based on an obtained first target picture; a selecting unit, configured to select a target region that meets a preset condition from the target region set as a candidate region to obtain a candidate region set; a second generating unit, configured to generate a second target picture based on the candidate region set; and a third generating unit, configured to generate picture related information based on the second target picture.

In a third aspect, some embodiments of the present disclosure provide an electronic device, comprising: one or more processors; and a storage apparatus, storing one or more programs, wherein the one or more programs, when executed by the one or more processors, cause the one or more processors to implement the method as described in the first aspect.

In a fourth aspect, some embodiments of the present disclosure provide a computer readable medium, storing a computer program, wherein the program implements the method as described in the first aspect when executed by a processor.

The method provided by some embodiments of the present disclosure realizes effective extraction of a target region in a first target picture. The target region displayed in the first target picture is further classified to generate picture related information. A recognition result of the first target picture is more accurate, so that a subsequent image processing technology has room for improvement. In addition, the information generation method of the present disclosure may further be applied to the technical field of virtual nail enhancement. A nail region displayed in the picture is extracted, recognized and classified, so that helps can be provided for the development of a virtual nail enhancement technology.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

FIG. 3 is a flow chart of some other embodiments of an information generation method according to the present disclosure.

FIG. 4 is a schematic structural diagram of some embodiments of an information generation apparatus according to the present disclosure.

DETAILED DESCRIPTION OF THE EMBODIMENTS

Embodiments of the present disclosure will be described in greater detail below with reference to the accompanying drawings. While certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for exemplary purposes only and are not intended to limit the scope of protection of the present disclosure.

It is also noted that, for ease of description, only those portions of the accompanying drawings are shown that relate to the invention in question. The embodiments and the features in the embodiments of the present disclosure may be combined with each other without conflict.

It should be noted that the concepts of "first" and "second" mentioned in this disclosure are used only to distinguish between different devices, modules or units, and are not intended to define the order or interdependence of the functions performed by these devices, modules or units.

It should be noted that the modifications of "one" and "more than one" referred to in this disclosure are illustrative rather than limiting, and it should be understood by those skilled in the art to mean "one or more" unless the context clearly indicates otherwise.

The names of the messages or information interacted between the plurality of devices in this implementation of the disclosure are used for illustrative purposes only and are not intended to limit the scope of those messages or information.

The present disclosure will be described in detail below with reference to the accompanying drawings and in combination with the embodiments.

Figure 1:
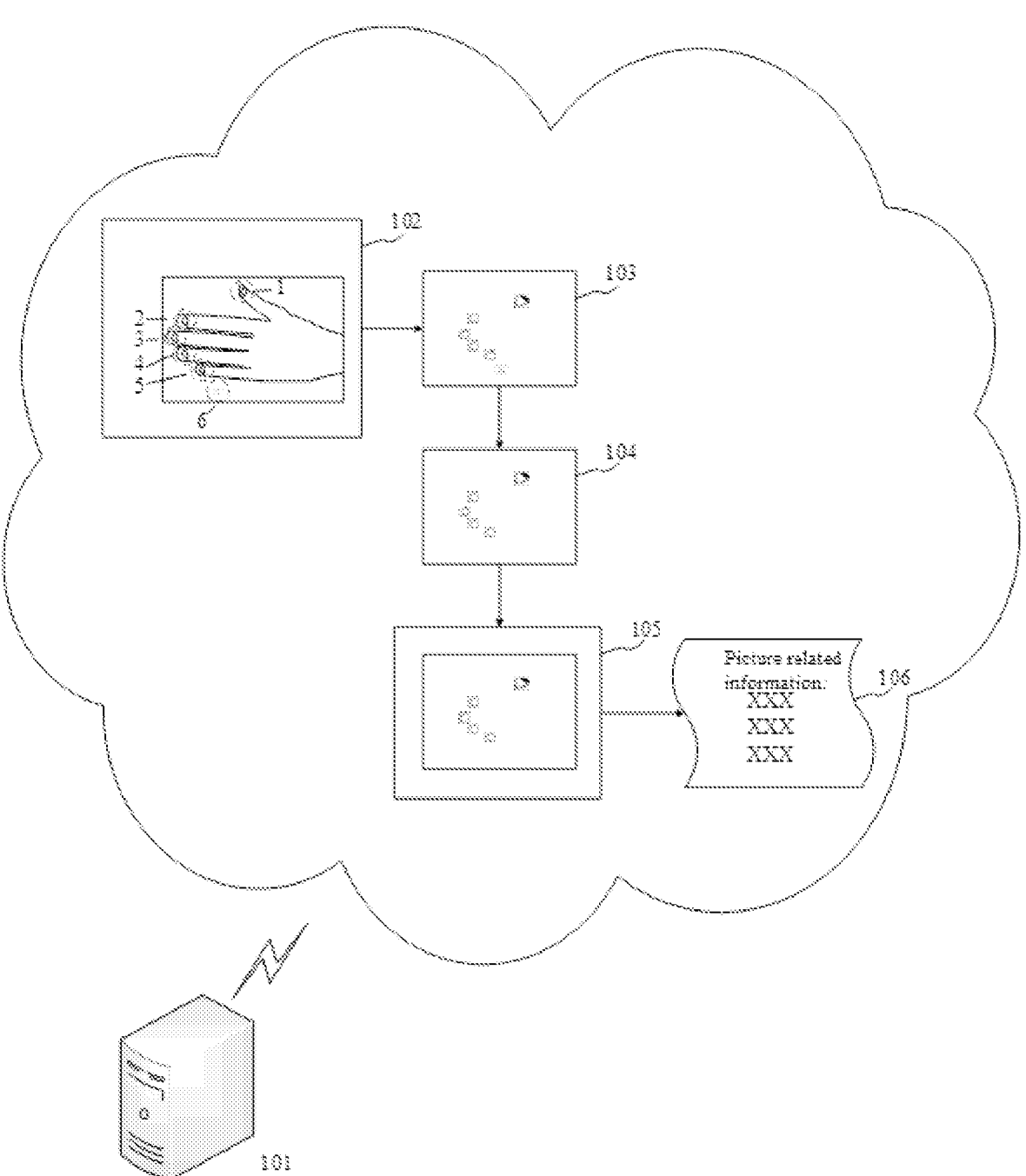
FIG. 1 is a schematic diagram of an application scene of an information generation method according to some embodiments of the present disclosure.

FIG. 1 is a schematic diagram of an application scene of an information generation method according to some embodiments of the present disclosure.

In the application scene of FIG. 1, first, a computing device 101 may generate a target region set 103 based on an obtained first target picture 102. Then, the computing device 101 may select a target region that meets a preset condition from the above target region set 103 as a candidate region to obtain a candidate region set 104. Then, the computing device may generate a second target picture 105 based on the candidate region set 104. Finally, the computing device 101 may generate picture related information 106.

It should be noted that the above computing device 101 may be hardware or software. When the computing device is the hardware, it may be implemented as a distributed cluster composed of a plurality of servers or terminal devices, and may also be implemented as a single server or a single terminal device. When the computing device is the software, it may be installed in the above listed hardware devices. It may be implemented as, for example, a plurality of software or software modules configured to provide distributed services, or it may also be implemented as single software or a single software module. No specific limitation is made here.

It should be understood that the number of the computing device in FIG. 1 is only schematic. According to implementation needs, there may be any number of computing devices.

Figure 2:
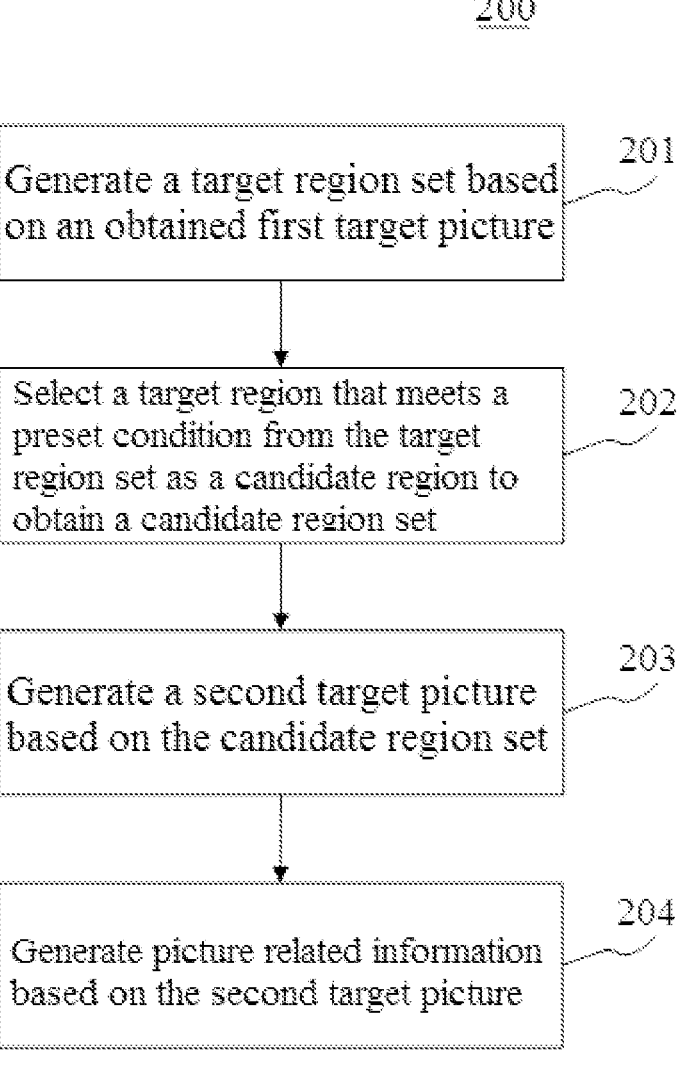
FIG. 2 is a flow chart of some embodiments of an information generation method according to the present disclosure.

Continue to refer to FIG. 2, which shows a flow 200 of some embodiments of an information generation method according to the present disclosure. The method may be executed by the computing device 101 in FIG. 1. The information generation method includes the following steps:

step 201, a target region set is generated based on an obtained first target picture.

In some embodiments, an executive body (such as the computing device 101 shown in FIG. 1) of the information generation method may perform image detection on the first target picture firstly to obtain location information of a target region (such as a nail). Then, based on the obtained location information of the target region, the above executive body may use a connected domain search method to determine a region contour of the target region. Then, the above executive body may segment the determined contour, so as to obtain the target region set. Here, image detection is usually used for detecting a location of the target region displayed in the above first target picture. Specifically, the location may be expressed in a form of coordinates. In an image, there are 8 adjacent pixels around each pixel, and an adjacency relation includes 4 adjacency and 8 adjacency. If two pixels are adjacent, they can be said to be connected, and a region formed by connected points is called a connected region. The connected domain search method may be a method for searching for each connected region in the target region and then marking and displaying them.

In some optional implementations of some embodiments, the above first target picture is a picture of a preset size intercepted from a to-be-intercepted picture, and the above to-be-intercepted picture is a picture in which a nail region is determined to be displayed.

In some optional implementations of some embodiments, the above executive body may input the above first target picture into a pre-trained first deep neural network to obtain the location information of the target region in the above first target picture.

In some optional implementations of some embodiments, the above first deep neural network may be trained by the following methods: first, the above executive body may obtain a training sample set, and a training sample in the above training sample set includes a sample picture and sample location information. Then, the above executive body may select the training sample from the above training sample set. Then, the sample picture in the selected training sample is taken as an input of an initial model, the sample location information corresponding to the above sample picture is taken as an expected output of the above initial model, and the above first deep neural network is obtained by training. The above initial model may be various neural networks that can obtain corresponding sample location information according to the above sample picture. Initial parameters are set in each layer of the above initial model, and the initial parameters may be continuously adjusted in a training process of the above first deep neural network. For example, a convolutional neural network (CNN).

In some optional implementations of some embodiments, the above first deep neural network includes a target region positioning network and a target region extraction network, the above target region positioning network is used for determining coordinates of the target region in the picture, and the above target region extraction network is used for extracting the target region based on the above coordinates. The above target region positioning network may adopt a target detection algorithm (Region-CNN and R-CNN). The above target region extraction network may adopt the following feature extraction algorithms: a support vector machine (SVM), a K nearest neighbor algorithm, a decision tree and naive bayes.

Step 202, a target region that meets a preset condition is selected from the target region set as a candidate region to obtain a candidate region set.

In some embodiments, the above executive body may select a target region with an area greater than a first preset threshold from the above target region set as the candidate region to obtain the candidate region set. The above executive body may also select a target region with a probability value greater than a second preset threshold from the above target region set as the candidate region to obtain the candidate region set. Here, the probability value may be a value used for representing a possibility that the target region is a nail region.

In some optional implementations of some embodiments, the above preset condition includes that a value of the area is greater than the first preset threshold or the probability value is greater than the second preset threshold.

Step 203, a second target picture is generated based on the candidate region set.

In some embodiments, the above executive body firstly may establish a plane rectangular coordinate system on a predetermined display plane. Then, the above executive body may map each candidate region in the candidate region set to the predetermined display plane according to the location information (such as coordinates) of the candidate region to obtain a mapping picture. Then, the above executive body may determine the above mapping picture as the second target picture.

Step 204, picture related information is generated based on the second target picture.

In some embodiments, the above executive body may generate the picture related information through the following steps: step 1, the above executive body may perform feature extraction on each candidate region displayed in the second target picture to obtain a feature of each candidate region, so as to generate a vector matrix; step 2, the above executive body may determine a similarity between the vector matrix of each candidate region and each preset contrast vector matrix in a preset contrast vector matrix set to obtain a similarity set of each candidate region; step 3, based on the similarity set of each candidate region, the above executive body may sort the similarity sets in an order of similarity from large to small to obtain a similarity sequence of each candidate region; step 4, the above executive body may select a similarity of a first location from the similarity sequence to obtain a first similarity set; step 5, the above executive body may determine category information of the preset contrast vector matrix corresponding to each similarity in the first similarity set as category information of each candidate region; step 6, the above executive body may input the above second target picture into a key point extraction network to obtain key point information of each candidate region in the above second target picture; and step 7, the above executive body may combine the category information and the key point information of each candidate region in the above second target picture to obtain the picture related information of the second target picture. Here, the similarity may be a score obtained by scoring a cosine distance between the vector matrix and the preset contrast vector matrix.

In some optional implementations of some embodiments, the above executive body may input the above second target picture into a pre-trained third deep neural network to obtain the picture related information.

In some optional implementations of some embodiments, the picture related information includes the category information and the key point information.

In some optional implementations of some embodiments, the above third deep neural network may include a category information generating network and a key point extraction network. The category information generating network includes a feature extraction network and a classifying network. Here, the feature extraction network is used for extracting the feature of the candidate region in the picture to generate the vector matrix, and the classifying network is used for classifying based on the above vector matrix to obtain the category information of the above candidate region. The key point extraction network is used for recognizing a key point in the second target picture to generate the key point information.

In some optional implementations of some embodiments, the above third deep neural network may be various neural networks that can obtain the category information and the key point information of the candidate region according to the second target picture. The above feature extraction network may adopt the following feature extraction algorithms: a support vector machine (SVM), a K nearest neighbor algorithm, a decision tree and naive bayes. The above classifying network may adopt linear discriminant analysis (LDA), a Gaussian classifier or a logical regression classifier. Here, categories may include, but not limited to at least one of the following: a thumb category, an index finger category, a middle finger category, a ring finger category and a little finger category. As an example, the category information may be that "this region belongs to the thumb".

The method provided by some embodiments of the present disclosure realizes effective extraction of the target region in the first target picture. The target region displayed in the first target picture is further classified to generate the picture related information. A recognition result of the first target picture is more accurate, so that the subsequent image processing technology has room for improvement.

The information generation method of the present disclosure may further be applied to the technical field of virtual nail enhancement. For a nail picture provided by a user, a nail region in the nail picture is extracted, so that each nail region in the nail picture can be obtained. Then, a second nail picture containing each nail region may be generated, so that the user can use it as the material to make the next picture. By further classifying each nail region, picture related information containing category information and key point information of the nail regions is generated. It can help the user understand the categories of the nail regions, reduce the time for the user to judge the categories of the nail regions, and laterally improve the utilization efficiency of the extracted nail regions.

Continue to refer to FIG. 3, which shows a flow chart 300 of some other embodiments of an information generation method according to the present disclosure. The method may be executed by the computing device 101 in FIG. 1. The information generation method includes the following steps:

step 301, a first target picture is input into a pre-trained first deep neural network to obtain a target region in the first target picture, so as to constitute a target region set.

In some embodiments, an executive body (such as the computing device 101 shown in FIG. 1) of the information generation method may input the first target picture into the pre-trained first deep neural network to obtain the target region in the first target picture. Here, the first deep neural network may be a pre-trained neural network model used for extracting for the target region in the picture.

Step 302, a target parameter of each target region in the target region set is determined.

In some embodiments, the above executive body may obtain an area of the target region through the following steps: step 1, the above executive body may obtain location information of each vertex of the above target region based on the location information of the target region obtained by above step 301; step 2, the above executive body may divide the above target region based on a preset dividing method, here, the preset dividing method may be to divide the target region into at least one triangle, and there is no overlap between the triangles; step 3, the above executive body may use a triangle area calculation method to calculate the area of each triangle based on the location information of each vertex of the above target region; and step 4, the above executive body may sum the obtained areas of the triangles to take a calculation result as the area of the above target region. Therefore, the above executive body may obtain the area of each target region in the target region set.

In some optional implementations of some embodiments, determining the area of each target region in the above target region set includes: the area of each target region in the above target region set is determined through a mode of dividing an interior of the target region or selecting a target point outside the above target region.

In some optional implementations of some embodiments, the above executive body may further obtain the area of the target region through the following steps: step 1, the above executive body may obtain location information of each vertex of the above target region based on the location information of the target region obtained by above step 301; step 2, the above executive body may connect each above vertex to determine a concave point of the above target region, here, the concave point may be a vertex of a reflex angle of the above target region; step 3, the above executive body may select a target point outside the target region from the first target picture; step 4, the above executive body may obtain location information of the target point; step 5, the above executive body may connect the target point with each vertex of the above target region sequentially to obtain a connecting polygon; step 6, the above executive body may divide the above connecting polygon based on the above preset dividing method to obtain at least one triangle; step 7, the above executive body may calculate the area of each triangle, sum the obtained areas of the triangles and take a calculation result as the area of the above connecting polygon; step 8, the above executive body may determine a region obtained by connecting the above target point with the concave point of the above target region and two vertices adjacent to the concave point as a concave region; step 9, the above executive body may use the above preset dividing method to calculate an area of the concave region; and step 10, the above executive body may determine an absolute value of a difference between the area of the above connecting polygon and the area of the above concave region as the area of the above target region.

In some embodiments, the above executive body may obtain the probability value of the target region through the following steps: step 1, the above executive body may perform feature extraction on each target region in the target region set to obtain a vector diagram of the target region, so as to constitute a vector diagram set; step 2, the above executive body may score a cosine distance between each vector diagram in the vector diagram set and a preset contrast vector diagram to obtain a cosine distance score; step 3, the above executive body may determine the cosine distance score as a confidence score of the vector diagram and the preset contrast vector diagram to obtain a confidence score set; and step 4, the above executive body may determine the confidence score corresponding to each target region as the probability value of the target region.

Specifically, in statistics, a confidence interval of a probability sample is an interval estimation on a certain population parameter of this sample. The confidence interval shows the degree to which a true value of this parameter has a certain probability to fall around a measurement result. The confidence interval gives a confidential degree of a measured value of the measured parameter, that is, the "certain probability" required previously. This probability is called a confidence level and is generally expressed in a form of a fraction.

Step 303, a predetermined number of target regions are selected from the target region set as candidate regions according to a value of the target parameter corresponding to each target region from large to small to obtain a candidate region set.

In some embodiments, the above executive body may select the predetermined number of target regions from the target region set as candidate regions in the order of areas from large to small. The above executive body may also select the predetermined number of target regions from the target region set as the candidate regions in an order of probability values from large to small.

In some optional implementations of some embodiments, the target regions with relatively small area values are screened out, and the regions with relatively large area values remain as the candidate regions. The generated second target picture can be more consistent with definition requirements. Screening out the target regions with relatively small probability values can make the generated second target picture more accurate.

Step 304, each candidate region in the candidate region set is mapped to a predetermined display picture box to obtain a mapping picture, and the mapping picture is determined as the second target picture.

In some embodiments, the above executive body firstly may calculate a relative distance and angle among all the candidate regions according to the location information of each candidate region. Then, the above executive body may map the candidate regions to the predetermined display picture box according to the relative distance and angle among all the candidate regions to obtain the mapping picture. Then, the above executive body may determine the above mapping picture as the second target picture. Here, a size of the above predetermined display picture box may be same as a size of the first target picture.

Step 305, picture related information is generated based on the second target picture.

In some embodiments, the specific implementation of step 305 and the resulting technical effects may refer to step 204 in those embodiments corresponding to FIG. 2, which will not be repeated here.

Step 306, the picture related information is pushed to a target device with a display function, and the target device is controlled to display the picture related information.

In some embodiments, the above executive body may push the picture related information to the target device with the display function, and control the target device to display the picture related information.

It can be seen from FIG. 3 that, compared with the description of some embodiments corresponding to FIG. 2, a flow 300 of an image classification method in some embodiments corresponding to FIG. 3 describes a process of extracting the target region displayed in an image and determining a target region category in details. Therefore, the solutions described in these embodiments determine the category of the target region and generate the category information and the key point information of the target region by segmenting the target region. An analysis result of the target region can be effectively provided.

Further referring to FIG. 4, as an implementation of the above method of each above figure, the present disclosure provides some embodiments of an information generation apparatus, these apparatus embodiments correspond to those above method embodiments in FIG. 2, and the apparatus may be specifically applied to various electronic devices.

As shown in FIG. 4, an information generation apparatus 400 of some embodiments includes: a first generating unit 401, a selecting unit 402, a second generating unit 403 and a third generating unit 404. The first generating unit 401 is configured to generate a target region set based on an obtained first target picture; the selecting unit 402 is configured to select a target region that meets a preset condition from the target region set as a candidate region to obtain a candidate region set; the second generating unit 403 is configured to generate a second target picture based on the candidate region set; and the third generating unit 404 is configured to generate picture related information based on the second target picture.

In some optional implementations of some embodiments, the above first target picture is a picture of a preset size intercepted from a to-be-intercepted picture, and the above to-be-intercepted picture is a picture in which a nail region is determined to be displayed.

In some optional implementations of some embodiments, the first generating unit 401 of the information generation apparatus 400 is further configured to: determine location information of the above target region in response to determining that the above first target picture contains the target region; and use a connected domain search method to segment the above target region from the above first target picture based on the location information of the above target region to obtain the above target region set.

In some optional implementations of some embodiments, determining, in response to determining that the above first target picture contains the target region, the location information of the above target region, includes: the above first target picture is input into a pre-trained first deep neutral network to obtain the location information of the target region in the above first target picture.

In some optional implementations of some embodiments, the first generating unit 401 of the information generation apparatus 400 is further configured to: input the above first target picture into a pre-trained second deep neural network to obtain the target region in the above first target picture, so as to constitute the target region set.

In some optional implementations of some embodiments, the selecting unit 402 of the information generation apparatus 400 is further configured to: determine a target parameter of each target region in the above target region set; and select a predetermined number of target regions from the above target region set as above candidate regions according to a value of the target parameter corresponding to each target region from large to small to obtain a candidate region set.

In some optional implementations of some embodiments, the above target parameter includes an area or a probability value.

In some optional implementations of some embodiments, determining the area of each target region in the above target region set includes: the area of each target region in the above target region set is determined through a mode of dividing an interior of the above target region or selecting a target point outside the above target region.

In some optional implementations of some embodiments, determining the target parameter of each target region in the above target region set, includes: based on a preset dividing method, each target region in the above target region set is divided to obtain at least one sub-region set; based on the location information of each target region, an area of each sub-region in the sub-region set corresponding to each target region is determined to obtain at least one sub-region area set; and the areas in the above at least one sub-region area set are summed to obtain the area of each target region.

In some optional implementations of some embodiments, determining the target parameter of each target region in the above target region set, includes: a target point outside the target region is selected in the above first target picture; the above target point is connected with each vertex of the above target region to obtain a connecting polygon; an area of the above connecting polygon is determined; an area of a concave region of the above target region is determined; and differencing is performed based on the area of the above connecting polygon and the area of the above concave region to obtain the area of the above target region.

In some optional implementations of some embodiments, determining the target parameter of each target region in the above target region set, includes: feature extraction is performed on each target region in the above target region set to obtain a vector diagram of the above target region, so as to constitute a vector diagram set; a confidence score of each vector diagram in the above vector diagram set and a preset contrast vector diagram to obtain a confidence score set; and the confidence score corresponding to each target region is determined as the probability value of the above target region.

In some optional implementations of some embodiments, the above preset condition includes that a value of the area is greater than a first preset threshold or the probability value is greater than a second preset threshold.

In some optional implementations of some embodiments, the second generating unit 403 of the information generation apparatus 400 is further configured to map each candidate region in the above candidate region set to a predetermined display picture box to obtain a mapping picture, and determine the above mapping picture as the above second target picture.

In some optional implementations of some embodiments, the above picture related information includes category information and key point information.

In some optional implementations of some embodiments, the third generating unit 404 of the information generation apparatus 400 is further configured to: input the above second target picture into a pre-trained third deep neural network to obtain the picture related information of the above second target picture.

In some optional implementations of some embodiments, the information generation apparatus 400 is further configured to push the above picture related information to a target device with a display function, and control the above target device to display the above picture related information.

It can be understood that all the units recorded in the apparatus 400 correspond to each step in the method described with reference to FIG. 2. Therefore, operations, features and generated beneficial effects described above for the method are also applicable to the apparatus 400 and the units contained therein, and will not be repeated here.

Figure 5:
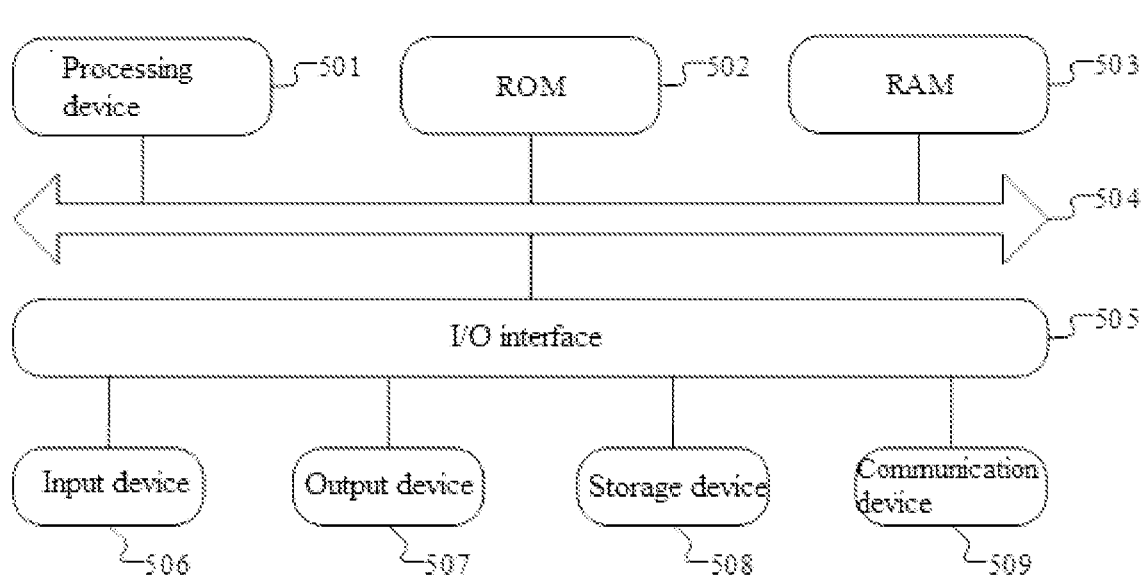
FIG. 5 is a schematic structural diagram of an electronic device suitable for implementing some embodiments of the present disclosure.

Reference is made below to FIG. 5, which illustrates a schematic diagram of the structure of an electronic device (e.g., computing device 101 in FIG. 1) 500 suitable for use in implementing some embodiments of the present disclosure. The server illustrated in FIG. 5 is merely an example and should not impose any limitations on the functionality or scope of use of embodiments of the present disclosure.

As shown in FIG. 5, the electronic device 500 may include a processing device (e.g., central processor, graphics processor, etc.) 501 that may perform various appropriate actions and processes based on a program stored in a read-only memory (ROM) 502 or loaded from a storage device 508 into a random access memory (RAM) 503. In RAM 503, various programs and data required for the operation of electronic device 500 are also stored. The processing devices 501, ROM 502, and RAM 503 are connected to each other via bus 504. The input/output (I/O) interface 505 is also connected to the bus 504.

Typically, the following devices can be connected to the I/O interface 505: input device 506 including, for example, a touch screen, touch pad, keyboard, mouse, camera, microphone, accelerometer, gyroscope, etc.; output device 507 including, for example, liquid crystal displays (LCDs), speakers, vibrators, etc.; storage device 508 including, for example, magnetic tapes, hard drives, etc.; and communication device 509. Communication device 509 may allow the electronic device 500 to communicate wirelessly or wired with other devices to exchange data. While FIG. 5 illustrates the electronic device 500 with various devices, it should be understood that it is not required to implement or have all of the devices illustrated. More or fewer devices may alternatively be implemented or available. Each box illustrated in FIG. 5 may represent one device, or multiple devices as desired.

In particular, according to some embodiments of the present disclosure, the process described above with reference to the flowchart may be implemented as a computer software program. For example, some embodiments of the present disclosure include a computer program product comprising a computer program carried on a computer readable medium, the computer program comprising program code for performing the method shown in the flowchart. In some such embodiments, the computer program may be downloaded and installed from a network via a communication device 509, or from a storage device 508, or from a ROM 502. When this computer program is executed by processing device 501, it performs the above-described functions as defined in the methods of some embodiments of the present disclosure.

It is to be noted that the computer readable medium described above in some embodiments of the present disclosure may be a computer readable signal medium or a computer readable storage medium or any combination of the foregoing. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In some embodiments of the present disclosure, the computer-readable storage medium may be any tangible medium that contains or stores a program that may be used by or in combination with an instruction execution system, device, or device. And in some embodiments of the present disclosure, the computer readable signaling medium may include a data signal propagated in the baseband or as part of a carrier wave carrying a computer readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in conjunction with the instruction execution system, device or device. The program code contained on the computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above-mentioned computer-readable medium may be contained in the above-mentioned device; or it may be separately present and not assembled into the electronic device. The above-mentioned computer readable medium carries one or more programs, and when the above-mentioned one or more programs are executed by the electronic device, the electronic device is caused to: generate a target area collection based on the acquired first target picture; select a target area meeting a predetermined condition from the target area collection as a candidate area to obtain a candidate area collection; generate a second target picture based on the candidate area collection; and generate picture-related information based on the based on the second target image, generating image related information.

Computer program code for performing the operations of some embodiments of the present disclosure can be written in one or more programming languages or combinations thereof, including object-oriented programming languages—such as Java, Smalltalk, C++, and also conventional procedural programming languages—such as "C" or the like. such as "C" language or similar programming languages. The program code may be executed entirely on the user's computer, partially on the user's computer, as a stand-alone package, partially on the user's computer and partially on a remote computer, or entirely on a remote computer or server.

In the case involving a remote computer, the remote computer may be connected to the user computer via any kind of network—including a local area network (LAN) or wide area network (WAN)—or, alternatively, may be connected to an external computer (e.g., using an Internet service provider to connect via the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in some embodiments of the present disclosure may be implemented by means of software or may be implemented by means of hardware. The units described may also be provided in a processor, for example, a processor may be described as comprising a first generation unit, a selection unit, a second generation unit, and a third generation unit. For example, the first generation unit may also be described as "a unit for generating a collection of target regions based on an acquired first target image".

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

According to one or more embodiments of the present disclosure, provide an information generation method, comprising: generating a target region set based on an obtained first target picture; selecting a target region that meets a preset condition from the target region set as a candidate region to obtain a candidate region set; generating a second target picture based on the candidate region set; and generating picture related information based on the second target picture.

According to one or more embodiments of the present disclosure, the above-mentioned first target picture is a picture of a preset size intercepted from a to-be-intercepted picture, and the to-be-intercepted picture is a picture in which a nail region is determined to be displayed.

According to one or more embodiments of the present disclosure, the above-mentioned generating the target region set based on the obtained first target picture, comprises: determining, in response to determining that the first target picture contains the target region, location information of the target region; and segmenting, based on the location information of the target region, the target region from the first target picture by using a connected domain search method to obtain the target region set.

According to one or more embodiments of the present disclosure, the above-mentioned determining, in response to determining that the first target picture contains the target region, location information of the target region, comprises: inputting the first target picture into a pre-trained first deep neural network to obtain the location information of the target region in the first target picture.

According to one or more embodiments of the present disclosure, the above-mentioned generating the target region set based on the obtained first target picture, comprises: inputting the first target picture into a pre-trained second deep neural network to obtain the target region in the first target picture, so as to constitute the target region set.

According to one or more embodiments of the present disclosure, the above-mentioned selecting the target region that meets the preset condition from the target region set as the candidate region to obtain the candidate region set, comprises: determining a target parameter of each target region in the target region set; and selecting a predetermined number of target regions from the target region set as candidate regions according to a value of the target parameter corresponding to each target region from large to small to obtain a candidate region set.

According to one or more embodiments of the present disclosure, the above-mentioned target parameter comprises an area or a probability value.

According to one or more embodiments of the present disclosure, the above-mentioned determining the area of each target region in the target region set, comprises: determining the area of each target region in the target region set through a mode of dividing an interior of the target region or selecting a target point outside the target region.

According to one or more embodiments of the present disclosure, the above-mentioned determining the target parameter of each target region in the target region set, comprises: dividing, based on a preset dividing method, each target region in the target region set to obtain at least one sub-region set; determining, based on location information of each target region, an area of each sub-region in the sub-region set corresponding to each target region to obtain at least one sub-region area set; and summing the areas in the at least one sub-region area set to obtain the area of each target region.

According to one or more embodiments of the present disclosure, the above-mentioned determining the target parameter of each target region in the target region set, comprises: selecting the target point outside the target region in the first target picture; connecting the target point with each vertex of the target region to obtain a connecting polygon; determining an area of the connecting polygon; determining an area of a concave region of the target region; and performing differencing based on the area of the connecting polygon and the area of the concave region to obtain the area of the target region.

According to one or more embodiments of the present disclosure, the above-mentioned determining the target parameter of each target region in the target region set, comprises: performing feature extraction on each target region in the target region set to obtain a vector diagram of the target region, so as to constitute a vector diagram set; determining a confidence score between each vector diagram in the vector diagram set and a preset contrast vector diagram to obtain a confidence score set; and determining the confidence score corresponding to each target region as the probability value of the target region.

According to one or more embodiments of the present disclosure, the above-mentioned preset condition comprises that a value of the area is greater than a first preset threshold or the probability value is greater than a second preset threshold.

According to one or more embodiments of the present disclosure, the above-mentioned generating the second target picture based on the candidate region set, comprises: mapping each candidate region in the candidate region set to a predetermined display picture box to obtain a mapping picture, and determining the mapping picture as the second target picture.

According to one or more embodiments of the present disclosure, the above-mentioned picture related information comprises category information and key point information.

According to one or more embodiments of the present disclosure, the above-mentioned generating the picture related information based on the second target picture, comprises: inputting the second target picture into a pre-trained third deep neural network to obtain the picture related information of the second target picture.

According to one or more embodiments of the present disclosure, the above-mentioned method further comprising:

pushing the picture related information to a target device with a display function, and controlling the target device to display the picture related information.

According to one or more embodiments of the present disclosure, provide an information generation apparatus, comprising: a first generating unit, configured to generate a target region set based on an obtained first target picture; a selecting unit, configured to select a target region that meets a preset condition from the target region set as a candidate region to obtain a candidate region set; a second generating unit, configured to generate a second target picture based on the candidate region set; and a third generating unit, configured to generate picture related information based on the second target picture.

According to one or more embodiments of the present disclosure, the above-mentioned first target picture is a picture of a preset size intercepted from a to-be-intercepted picture, and the to-be-intercepted picture is a picture in which a nail region is determined to be displayed.

According to one or more embodiments of the present disclosure, the first generating unit of the information generation apparatus is further configured to: determine, in response to determining that the first target picture contains the target region, location information of the target region; and segment, based on the location information of the target region, the target region from the first target picture by using a connected domain search method to obtain the target region set.

According to one or more embodiments of the present disclosure, the above-mentioned determine, in response to determining that the first target picture contains the target region, location information of the target region, comprises: input the first target picture into a pre-trained first deep neural network to obtain the location information of the target region in the first target picture.

According to one or more embodiments of the present disclosure, the first generating unit of the information generation apparatus is further configured to: input the first target picture into a pre-trained second deep neural network to obtain the target region in the first target picture, so as to constitute the target region set.

According to one or more embodiments of the present disclosure, the selecting unit of the information generation apparatus is further configured to: determine a target parameter of each target region in the target region set; and select a predetermined number of target regions from the target region set as candidate regions according to a value of the target parameter corresponding to each target region from large to small to obtain a candidate region set.

According to one or more embodiments of the present disclosure, the above-mentioned target parameter comprises an area or a probability value.

According to one or more embodiments of the present disclosure, the above-mentioned determine the area of each target region in the target region set, comprises: determine the area of each target region in the target region set through a mode of dividing an interior of the target region or selecting a target point outside the target region.

According to one or more embodiments of the present disclosure, the above-mentioned determine the target parameter of each target region in the target region set, comprises: divide, based on a preset dividing method, each target region in the target region set to obtain at least one sub-region set; determine, based on location information of each target region, an area of each sub-region in the sub-region set corresponding to each target region to obtain at least one sub-region area set; and summing the areas in the at least one sub-region area set to obtain the area of each target region.

According to one or more embodiments of the present disclosure, the above-mentioned determine the target parameter of each target region in the target region set, comprises: select the target point outside the target region in the first target picture; connect the target point with each vertex of the target region to obtain a connecting polygon; determine an area of the connecting polygon; determine an area of a concave region of the target region; and perform differencing based on the area of the connecting polygon and the area of the concave region to obtain the area of the target region.

According to one or more embodiments of the present disclosure, the above-mentioned determine the target parameter of each target region in the target region set, comprises: perform feature extraction on each target region in the target region set to obtain a vector diagram of the target region, so as to constitute a vector diagram set; determine a confidence score between each vector diagram in the vector diagram set and a preset contrast vector diagram to obtain a confidence score set; and determine the confidence score corresponding to each target region as the probability value of the target region.

According to one or more embodiments of the present disclosure, the above-mentioned preset condition comprises that a value of the area is greater than a first preset threshold or the probability value is greater than a second preset threshold.

According to one or more embodiments of the present disclosure, the above-mentioned generate the second target picture based on the candidate region set, comprises: map each candidate region in the candidate region set to a predetermined display picture box to obtain a mapping picture, and determine the mapping picture as the second target picture.

According to one or more embodiments of the present disclosure, the above-mentioned picture related information comprises category information and key point information.

According to one or more embodiments of the present disclosure, the third generating unit of the information generation apparatus is further configured to: input the second target picture into a pre-trained third deep neural network to obtain the picture related information of the second target picture.

According to one or more embodiments of the present disclosure, the information generation apparatus is further configured to: push the picture related information to a target device with a display function, and control the target device to display the picture related information.

The above description is only a description of some preferred embodiments of the present disclosure and of the technical principles employed. It should be understood by those skilled in the art that the scope of the invention covered by the embodiments of the present disclosure is not limited to technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. A method for improving accuracy of results of recognizing pictures, comprising:

obtaining a first target picture that comprises a target region;

determining location information of the target region based on performing image detection on the first target picture;

performing a connected domain search among pixels based on the location information of the target region;

detecting a region contour of the target region based on a result of the connected domain search;

segmenting the target region from the first target picture based on the detected region contour of the target region to generate a target region set, wherein the target region set comprises a plurality of subregions;

selecting at least one subset of the plurality of subregions that meets a preset condition from the target region set to obtain a candidate region set, wherein the candidate region set comprises the at least one subset of the plurality of subregions;

establishing a plane rectangular coordinate system on a predetermined display plane, wherein a size of the predetermined display plane is the same as a size of the first target picture;

calculating relative distances and angles among the at least one subset of the plurality of subregions based on location information of the at least one subset of the plurality of subregions;

generating a mapping picture by mapping each of the at least one subset of the plurality of subregions to the predetermined display plane based on the relative distances and angles among the at least one subset of the plurality of subregions;

determining the mapping picture as a second target picture; and generating picture related information based on the second target picture, wherein the picture related information comprises category information and key point information of each subregion in the candidate region set.

2. The method according to claim 1, wherein the first target picture is a picture of a preset size intercepted from a to-be-intercepted picture, and the to-be-intercepted picture is a picture in which a nail region is determined to be displayed.

3. The method according to claim 1, wherein the method further comprises:

inputting the first target picture into a pre-trained first deep neural network to obtain the location information of the target region in the first target picture.

4. The method according to claim 1, wherein the method further comprises:

inputting the first target picture into a pre-trained second deep neural network to obtain the target region in the first target picture so as to constitute the target region set.

5. The method according to claim 1, wherein selecting the at least one subset of the plurality of subregions that meets the preset condition from the target region set as the candidate region to obtain the candidate region set, comprises:

determining a target parameter of each subregion in the target region set; and selecting a predetermined number of target-subregions from the target region set according to a value of the target parameter corresponding to each subregion from large to small to obtain the candidate region set.

6. The method according to claim 5, wherein, the target parameter comprises an area or a probability value.

7. The method according to claim 6, wherein determining the area of the each subregion in the target region set, comprises:

determining the area of the each subregion in the target region set through a mode of dividing an interior of the each subregion or selecting a target point outside the each subregion.

8. The method according to claim 7, wherein determining the target parameter of the each subregion in the target region set, comprises:

dividing, based on a preset dividing method, the each subregion in the target region set;

determining, based on location information of the each subregion, an area of each divided part sub corresponding to the each subregion; and summing the areas of the divided parts to obtain the area of the each subregion.

9. The method according to claim 7, wherein determining the target parameter of the each subregion in the target region set, comprises:

selecting a target point outside the each subregion in the first target picture;

connecting the target point with each vertex of the each subregion to obtain a connecting polygon;

determining an area of the connecting polygon;

determining an area of a concave region of the each subregion; and performing differencing based on the area of the connecting polygon and the area of the concave region to obtain the area of the each subregion.

10. The method according to claim 7, wherein determining the target parameter of the each subregion in the target region set, comprises:

performing feature extraction on the each subregion in the target region set to obtain a vector diagram of the each subregion so as to constitute a vector diagram set;

determining a confidence score between each vector diagram in the vector diagram set and a preset contrast vector diagram to obtain a confidence score set; and determining the confidence score corresponding to the each subregion as the probability value of the each subregion target region.

11. The method according to claim 7, wherein the preset condition comprises that a value of the area is greater than a first preset threshold or the probability value is greater than a second preset threshold.

12. The method according to claim 1, wherein the method further comprises:

inputting the second target picture into a pre-trained third deep neural network to obtain the picture related information of the second target picture.

13. The method according to claim 1, further comprising:

pushing the picture related information to a target device with a display function, and controlling the target device to display the picture related information.

14. An electronic device, comprising:

one or more processors; and a storage apparatus, storing one or more programs, wherein the one or more programs, when executed by the one or more processors, cause the one or more processors to implement operations comprising:

obtaining a first target picture that comprises a target region;

determining location information of the target region based on performing image detection on the first target picture;

performing a connected domain search among pixels based on the location information of the target region;

detecting a region contour of the target region based on a result of the connected domain search;

segmenting the target region from the first target picture based on the detected region contour of the target region to generate a target region set, wherein the target region set comprises a plurality of subregions;

selecting at least one subset of the plurality of subregions that meets a preset condition from the target region set to obtain a candidate region set, wherein the candidate region set comprises the at least one subset of the plurality of subregions;

establishing a plane rectangular coordinate system on a predetermined display plane, wherein a size of the predetermined display plane is the same as a size of the first target picture;

calculating relative distances and angles among the at least one subset of the plurality of subregions based on location information of the at least one subset of the plurality of subregions;

generating a mapping picture by mapping each of the at least one subset of the plurality of subregions to the predetermined display plane based on the relative distances and angles among the at least one subset of the plurality of subregions;

determining the mapping picture as generating a second target picture; and generating picture related information based on the second target picture, wherein the picture related information comprises category information and key point information of each subregion in the candidate region set.

15. A non-transitory computer readable medium, storing a computer program, wherein the program implements operations when executed by a processor, the operations comprising:

obtaining a first target picture that comprises a target region;

determining location information of the target region based on performing image detection on the first target picture;

performing a connected domain search among pixels based on the location information of the target region;

detecting a region contour of the target region based on a result of the connected domain search;

segmenting the target region from the first target picture based on the detected region contour of the target region to generate a target region set, wherein the target region set comprises a plurality of subregions;

selecting at least one subset of the plurality of subregions that meets a preset condition from the target region set to obtain a candidate region set, wherein the candidate region set comprises the at least one subset of the plurality of subregions;

establishing a plane rectangular coordinate system on a predetermined display plane, wherein a size of the predetermined display plane is the same as a size of the first target picture;

calculating relative distances and angles among the at least one subset of the plurality of subregions based on location information of the at least one subset of the plurality of subregions;

generating a mapping picture by mapping each of the at least one subset of the plurality of subregions to the predetermined display plane based on the relative distances and angles among the at least one subset of the plurality of subregions;

determining the mapping picture as a second target picture; and generating picture related information based on the second target picture, wherein the picture related information comprises category information and key point information of each subregion in the candidate region set.

16. The electronic device according to claim 14, wherein the first target picture is a picture of a preset size intercepted from a to-be-intercepted picture, and the to-be-intercepted picture is a picture in which a nail region is determined to be displayed.

* * * * *